US012806911B2

(12) United States Patent
Sano

(10) Patent No.: US 12,806,911 B2
(45) Date of Patent: Nov. 24, 2026

(54) INKJET PRINTING APPARATUS AND CONTROL METHOD THEREOF THAT INCLUDE FIRST AND SECOND ESTIMATION UNITS TO ESTIMATE INK AMOUNTS IN FIRST AND SECOND TANKS AND A CONTROL UNIT TO CONTROL INK SUPPLY

(71) Applicant: CANON KABUSHIKI KAISHA, Tokyo (JP)

(72) Inventor: Yuta Sano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 202 days.

(21) Appl. No.: 18/744,492

(22) Filed: Jun. 14, 2024

(65) Prior Publication Data

US 2024/0416659 A1 Dec. 19, 2024

(30) Foreign Application Priority Data

Jun. 19, 2023 (JP) ................................. 2023-099879

(51) Int. Cl.

*B41J 2/175* (2006.01)
*B41J 2/21* (2006.01)
*B41J 29/46* (2006.01)

(52) U.S. Cl.

CPC ......... *B41J 2/17566* (2013.01); *B41J 2/2117* (2013.01); *B41J 29/46* (2013.01); *B41J 2002/17569* (2013.01)

(58) Field of Classification Search

CPC .. B41J 2/17566; B41J 2/17509; B41J 2/2117; B41J 2/175; B41J 29/46; B41J 2002/17569; B41J 2002/17573; B41J 2002/17576; B41J 2002/17579; B41J 2002/17583; B41J 2002/17586; B41J 2002/17589

See application file for complete search history.

(56) References Cited

U.S. PATENT DOCUMENTS

2020/0047510 A1* 2/2020 Harai .................. B41J 2/17546

FOREIGN PATENT DOCUMENTS

JP 2008-074011 4/2008

* cited by examiner

*Primary Examiner* — Kristal Feggins

(74) *Attorney, Agent, or Firm* — Venable LLP

(57) ABSTRACT

A printing apparatus including first and second printing heads to eject ink, a first buffer tank installed corresponding to the first printing head to store ink supplied to the first printing head, a second buffer tank corresponding to the second printing head to store ink to be supplied to the second printing head, a first ink tank corresponding to the first buffer tank to store ink to be supplied to the first buffer tank, a second ink tank corresponding to the second buffer tank to store ink to be supplied to the second buffer tank, the first and second ink tanks being removable from the printing apparatus, a first estimation unit to estimate ink amounts in the first and second ink tanks, a second estimation unit to estimate ink amounts in the first and second buffer tanks, and a control unit to control supply of ink.

11 Claims, 6 Drawing Sheets

INKJET PRINTING APPARATUS AND CONTROL METHOD THEREOF THAT INCLUDE FIRST AND SECOND ESTIMATION UNITS TO ESTIMATE INK AMOUNTS IN FIRST AND SECOND TANKS AND A CONTROL UNIT TO CONTROL INK SUPPLY

BACKGROUND OF THE INVENTION

Cross Reference to Priority Application

This application claims the benefit of Japanese Patent Application No. 2023-099879, filed Jun. 19, 2023, which is hereby incorporated by reference herein in its entirety.

FIELD OF THE INVENTION

The present disclosure relates to an inkjet printing apparatus and a control method thereof.

DESCRIPTION OF THE RELATED ART

An inkjet printing apparatus equipped with a printing head that ejects ink of multiple colors has been provided. It is required for inkjet printing apparatuses to perform printing continuously for a long period of time on printing media such as roll paper or cut paper, for example. In order to perform printing for a long period of time, an ink tank capable of storing a large volume of ink or multiple buffer tanks are necessary. However, such a configuration leads to an increase in size of the apparatus, resulting in insufficient space for installation and an increase in cost. In addition, since the frequency of use of each ink is different, the timing of ink replenishment for each ink is different. Therefore, each time an individual ink tank becomes empty, the user needs replacement of the ink tank or ink replenishment.

Japanese Patent Laid-Open No. 2008-74011 (hereafter referred to as the ’011 document) discloses a technology in which, in a case when an empty ink tank is detected, if the ink remaining amount of another ink tank is equal to or less than a predetermined amount, that ink tank is awaited to become empty of ink, so that instructions to replace multiple ink tanks will be output at once.

In the technology disclosed in the ’011 document, the replacement of the ink tank that became empty first is awaited until the ink remaining in another ink tank is fully consumed. Therefore, in a case when there is a difference in the degrees of ink consumption, the replacement timings may not be as expected by the user.

SUMMARY OF THE INVENTION

A printing apparatus according to an embodiment of the present disclosure includes a first printing head and a second printing head configured to eject ink, a first buffer tank installed corresponding to the first printing head and configured to store ink to be supplied to the first printing head, a second buffer tank installed corresponding to the second printing head and configured to store ink to be supplied to the second printing head, a first ink tank installed corresponding to the first buffer tank and configured to store ink to be supplied to the first buffer tank, the first ink tank being removable to the printing apparatus, a second ink tank installed corresponding to the second buffer tank and configured to store ink to be supplied to the second buffer tank, the second ink tank being removable to the printing apparatus, a first estimation unit configured to estimate ink amounts in the first ink tank and the second ink tank, a second estimation unit configured to estimate ink amounts in the first buffer tank and the second buffer tank, a supply unit configured to execute a first supply process in which, if the second estimation unit estimates that a liquid level in the first buffer tank has reached a lower limit position, an amount of ink to make the liquid level in the first buffer tank reach an upper limit position is supplied from the first ink tank to the first buffer tank, and a second supply process in which, if the first estimation unit estimates that the first ink tank is empty of ink, a remaining ink in the second ink tank is supplied up to a liquid level beyond an upper limit position in the second buffer tank, depending on the ink amount in the second ink tank and the ink amount in the second buffer tank; and a notification unit configured to provide a notification of replacement of the first ink tank and the second ink tank after the second supply process is executed.

Further features of the present invention will become apparent from the following description of exemplary embodiments with reference to the attached drawings.

BRIEF DESCRIPTION OF THE DRAWINGS

FIG. 5 is a diagram showing the relationship of FIGS. 5A and 5B.

DESCRIPTION OF THE EMBODIMENTS

Hereafter, a detailed explanation is given of preferable embodiments of the present disclosure with reference to the accompanying drawings. The following embodiments are not intended to limit the contents of the present disclosure, and every combination of the characteristics explained in the following embodiments is not necessarily essential to the solutions provided in the present disclosure. The same reference numbers are given to the same constituent elements.

<Configuration of the Printing Apparatus>

Figure 1:
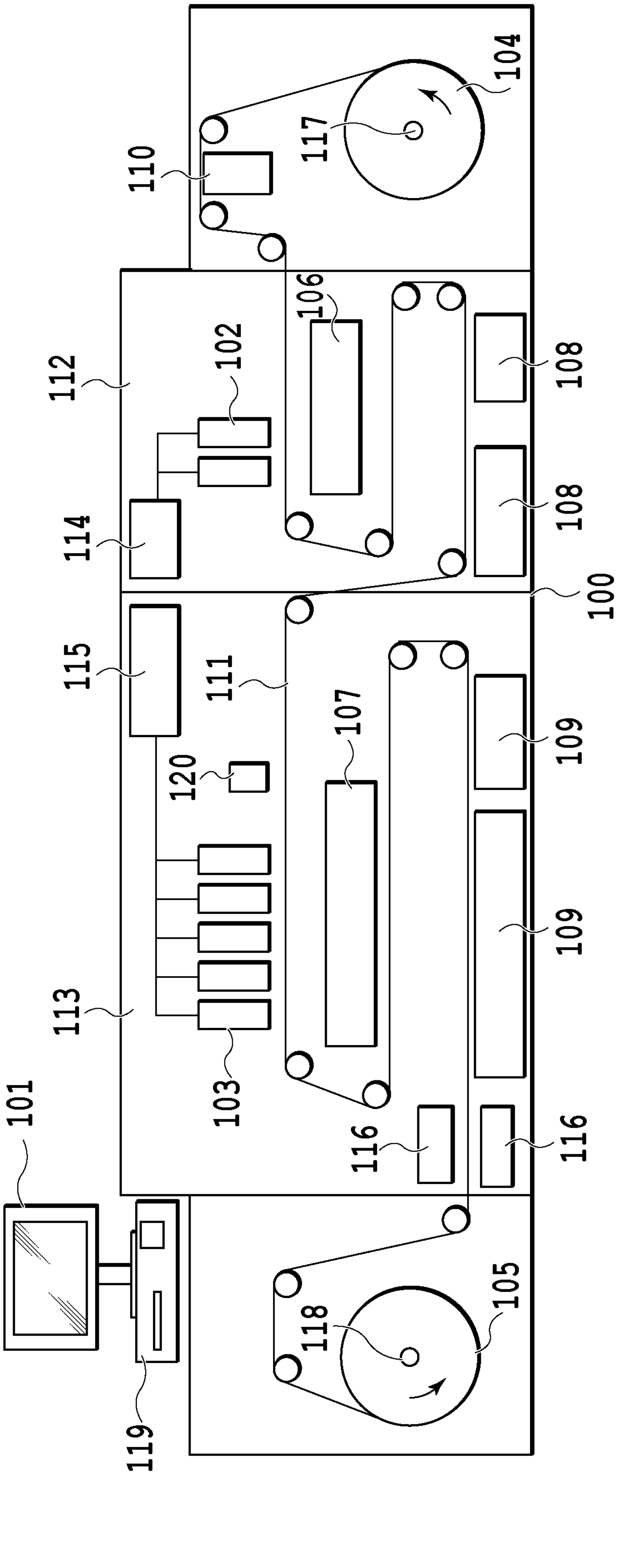
FIG. 1 is a front view diagram schematically illustrating a printing apparatus.

FIG. 1 is a front view diagram schematically illustrating the inkjet printing apparatus 100 (hereafter referred to as the printing apparatus 100) according to the present embodiment. The printing apparatus 100 is an apparatus that performs printing on continuous paper (hereafter referred to as “roll paper”) 111 on which continuous printing can be performed. In the present embodiment, the printing apparatus 100 has the feeding device 104 that conveys the roll paper 111, the white printing room 112 in which printing with white ink is performed, and the color printing room 113 in which printing with chromatic color inks is performed. Further, the printing apparatus 100 has the discharge device 105 that winds up the roll paper 111, and the operation unit 101. The white printing room 112 includes the first printing heads 102 that perform printing with white ink and the first ink supply device 114 that supplies liquid (ink) to the first printing heads 102. In the example in FIG. 1, the two first printing heads 102 are installed. The color printing room 113 includes the second printing heads 103 that perform printing with chromatic color inks and the second ink supply device 115 that supplies liquid (ink) to the second printing heads 103. In the example in FIG. 1, the five second printing heads 103 are installed.

The feeding device 104 is a device that supplies the roll paper 111 to the white printing room 112 and the color printing room 113. The feeding device 104 rotates the paper tube of the roll paper 111 about the rotation shaft 117, so as to convey the roll paper 111 wound around the paper tube toward the white printing room 112 at a constant speed via multiple rollers (conveyance rollers, feeding rollers, etc.).

The discharge device 105 is a device that winds up the roll paper 111 conveyed from the color printing room 113 into a roll shape about the paper tube. In the discharge device 105, as illustrated in FIG. 1 for example, the roll paper 111 wound around the paper tube on the rotation shaft 118 is held in a roll shape. The discharge device 105 is a device that rotates about the rotation shaft 118, so as to wind up the roll paper 111 conveyed to the paper tube around the rotation shaft 118 at a constant speed via multiple rollers (for example, conveyance rollers and discharge rollers) as a product of the roll paper.

Before printing is started, a job of passing the roll paper 111 from the feeding device 104 through the discharge device 105 is performed. First, the roll paper 111 is set onto the feeding device 104 and the tip of the roll paper 111 is passed over the skew correction device 110. Next, in the white printing room 112, the roll paper 111 is passed under the first printing heads 102 of the inkjet printing system, under the first drying device 106, and over the first cooling device 108, in that order. Next, in the color printing room 113, the roll paper 111 is passed under the timing mark detection device 120, under the second printing heads 103, under the second drying device 107, and over the second cooling device 109, in that order. Furthermore, the roll paper 111 is passed through the scanner device 116 and wrapped around the discharge device 105 to complete the preparation of the roll paper 111.

After the roll paper 111 is passed through the printing apparatus 100, a print job is input to the PC 119 for controlling the printing apparatus 100. After a print job is input, if the print start button is pressed on the operation unit 101, the printing apparatus 100 starts printing.

Figure 2:
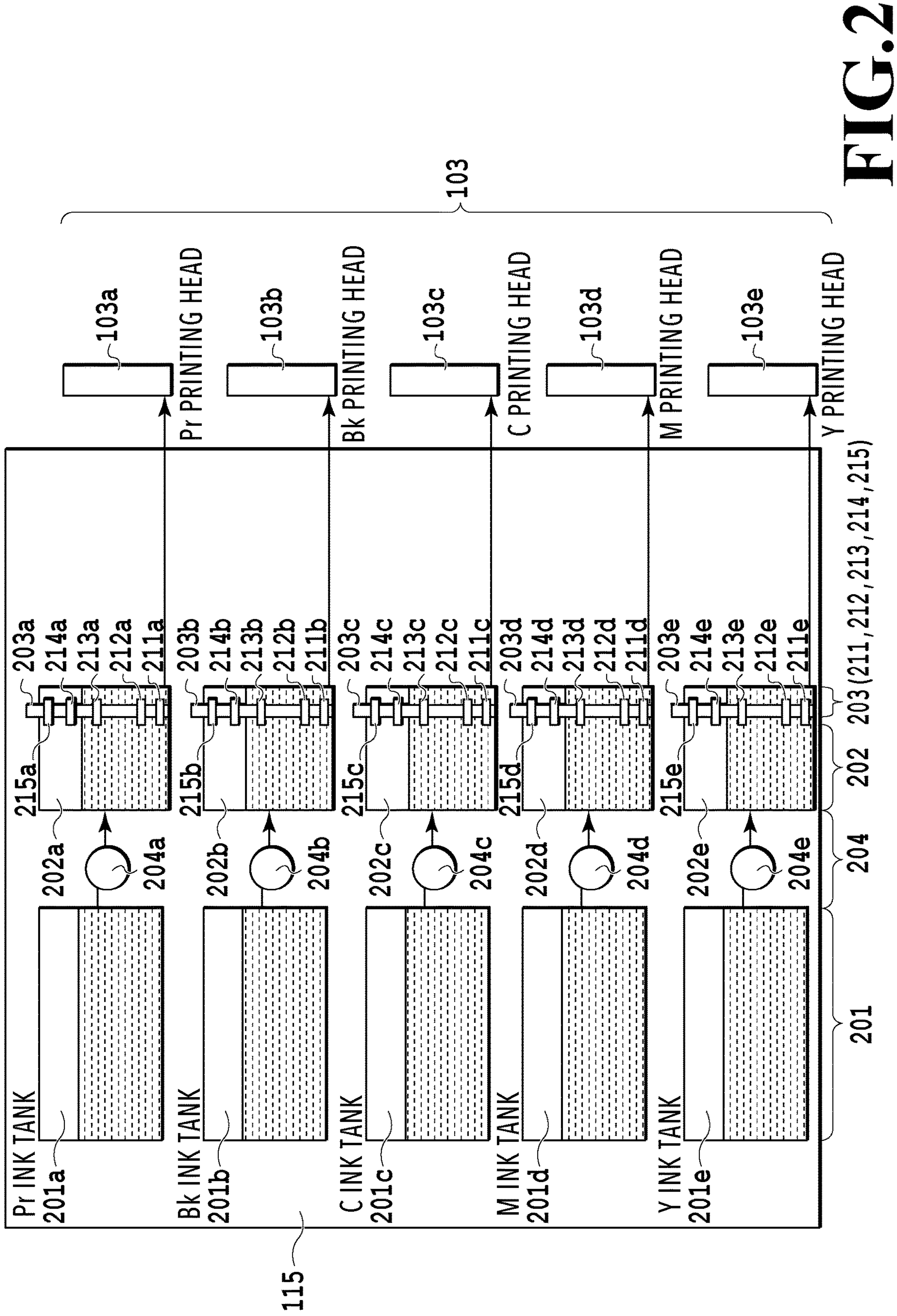
FIG. 2 is a diagram schematically illustrating second printing heads and a second ink supply device.

FIG. 2 is a diagram schematically illustrating the second printing heads 103 and the second ink supply device 115 in the color printing room 113 according to the present embodiment. The second ink supply device 115 has the ink tanks 201, the buffer tanks 202, the float sensors 203, and the supply pumps 204. In the present embodiment, the five second printing heads 103 are installed. The multiple second printing heads 103 eject different types of liquid, respectively. Specifically, the second printing heads 103 include the second printing head (Pr printing head) 103*a* that ejects Pr (primer liquid) and the second printing head (Bk printing head) 103*b* that ejects Bk (black ink), in that order, from upstream in the conveyance direction of the roll paper 111. Subsequently, there are the second printing head (C printing head) 103*c* that ejects C (cyan ink), the second printing head (M printing head) 103*d* that ejects M (magenta ink), and the second printing head (Y printing head) 103*e* that ejects Y (yellow ink). Hereafter, for describing individual configurations, the branch numbers are added to the ends of the signs, such as the second printing head 103*a*. However, the branch numbers are omitted for describing the contents common to each head. Explanations are given in the same manner regarding the signs for the buffer tanks 202, the float sensors 203, and the supply pumps 204 as well. In the present embodiment, the second printing heads 103 are described as heads that eject different liquids, respectively, but may be configured to eject the same type of liquid. Further, the number of second printing heads 103 is not limited to five. Any configuration is possible as long as multiple printing heads are mounted together with the hereafter-described first printing heads 102 in the white printing room 112.

Further, in the present specification, the printing heads in the color printing room 113 are referred to as the second printing heads, and the printing heads in the white printing room 112 are referred to as the first printing heads, but the first and second in the names are added for convenience. The printing heads in the color printing room 113 may be referred to as the first printing heads. To distinguish the printing heads within the color printing room 113, any given two printing heads in the color printing room 113 may be referred to as the first printing head and the second printing head. Further, the printing heads in the white printing room 112 may be referred to as the third printing heads. In the following explanation, the printing heads in the color printing room 113 are referred to as the second printing heads, and the printing heads in the white printing room 112 are referred to as the first printing heads.

The ink tanks 201 are removable liquid accommodation tanks installed for refilling the printing apparatus 100 with ink from the outside. The ink tank 201*a* accommodates Pr, the ink tank 201*b* accommodates Bk, the ink tank 201*c* accommodates C, the ink tank 201*d* accommodates M, and the ink tank 201*e* accommodates Y. The inks (liquids) in the ink tanks 201 are supplied to the buffer tanks 202 by the driving force of the supply pumps 204. That is, the ink in the ink tank 201*a* is supplied to the buffer tank 202*a* by the driving force of the supply pump 204*a*. The ink in the ink tank 201*b* is supplied to the buffer tank 202*b* by the driving force of the supply pump 204*b*. The ink in the ink tank 201*c* is supplied to the buffer tank 202*c* by the driving force of the supply pump 204*c*. The ink in the ink tank 201*d* is supplied to the buffer tank 202*d* by the driving force of the supply pump 204*d*. The ink in the ink tank 201*e* is supplied to the buffer tank 202*e* by the driving force of the supply pump 204*e*. The buffer tanks 202 are equipped with the float sensors 203. That is, the buffer tanks 202*a*, 202*b*, 202*c*, 202*d*, and 202*e* are equipped with the float sensors 203*a*, 203*b*, 203*c*, 203*d*, and 203*e*, respectively. In a case when each float sensor 203 detects that the amount of ink stored in the buffer tank 202 has decreased below a predetermined amount, ink is supplied from the ink tank 201 to the buffer tank 202. The inks ejected by the second printing heads 103 are supplied from the buffer tanks 202 via ink channels.

In the present embodiment, each float sensor 203 has five floats in the direction of gravity. Specifically, from below in the direction of gravity, the first float 211, the second float 212, the third float 213, the fourth float 214, and the fifth float 215 are installed in that order. Each of the first float 211, the second float 212, the third float 213, the fourth float 214, and the fifth float 215 has a shaft penetrating through the float itself for support. Inside the shaft penetrating through the float itself for support, a magnetic switch is installed. Each of the floats 211 to 215 has a lower specific gravity than the liquid (ink) stored inside. Therefore, each of the floats 211 to 215 moves in the direction of gravity (in the up-down direction) according to the liquid level of the liquid (ink) in the buffer tank 202.

Each of the floats 211 to 215 is configured to be capable of detecting its liquid level with the corresponding magnetic switch in a case of being displaced in the upward direction according to the liquid level. In the present example, the liquid levels in the buffer tanks 202 are detected according to the displacement of the floats installed at relatively upper positions in the direction of gravity. For example, if the liquid level of the second float 212 is detected, the liquid level of the first float 211 is also detected. In a case when the liquid levels of the first float 211 and the second float 212 are detected and the liquid level of the third float 213 is not detected, the liquid level in that buffer tank 202 is specified as being at or above the second float 212 and below the third float.

An explanation is given of the role of each float. The third float 213 (213*a*, 213*b*, 213*c*, 213*d*, 213*e*) is used to detect the lower limit for the timing to start ink supply from the ink tank 201 to the buffer tank 202. In other words, if ink is consumed by printing from the second printing head 103, etc., and the liquid level is detected to be lower than the third float 213, then ink supply from the ink tank 201 to the buffer tank 202 is started. The fourth float 214 (214*a*, 214*b*, 214*c*, 214*d*, 214*e*) is used to detect the upper limit for supplying ink from the ink tank 201 to the buffer tank 202. In other words, if it is detected, with the displacement of the third float, that the liquid level in the buffer tank 202 has reached the lower limit position, ink is supplied from the ink tank 201 up to the upper limit position in the buffer tank. In a case when the ink is supplied up to the upper limit position with the displacement of the fourth float 214, the ink supply from the ink tank 201 to the buffer tank 202 is stopped. In this way, the third floats 213 and the fourth floats 214 are used to adjust the amounts of ink in the buffer tanks 202. Thereafter, if ink is consumed and the liquid level is detected to be lower than the third float 213, then ink supply from the ink tank 201 to the buffer tank 202 is performed up to the upper limit position of the fourth float 214 again. In this way, in the color printing room 113, ink supply from the ink tank 201 to the buffer tank 202 is performed each time the ink remaining amount in the buffer tank 202 falls below the predetermined amount.

The first float 211 (211*a*, 211*b*, 211*c*, 211*d*, 211*e*) is used to detect an end error for notifying the user that printing is to be stopped. If displacement of the first float 211 is detected, it is notified that printing is to be stopped because the ink has run out, and the control to stop printing is performed. The second float 212 (212*a*, 212*b*, 212*c*, 212*d*, 212*e*) is used to detect a near-end before the ink in the buffer tank 202 runs out. If displacement of the second float 212 is detected, it is notified that a run-out of ink is close. The fifth float 215 (215*a*, 215*b*, 215*c*, 215*d*, 215*e*) is used for detection to prevent leakage of the ink in the buffer tank 202. As described above, the ink supply from the ink tank 201 to the buffer tank 202 is performed up to the upper limit position in the buffer tank. Therefore, detection of displacement of the fifth float 215 is not expected under normal usage patterns. In other words, the case in which displacement in the leakage prevention position at the fifth float 215 is detected may be a case in which a motor, sensor, or the like has a problem. Therefore, in a case when displacement of the fifth float 215 is detected, the control to stop the printing apparatus 100, etc., is performed.

In this way, in the present embodiment, the amounts of ink in the buffer tanks 202 can be estimated by the float sensors 203. Further, the later-described ink supply control unit 409 (FIG. 4) can estimate the amounts of ink supplied from the ink tanks 201 to the buffer tanks 202 using the driving amounts of the respective supply pumps 204. Since the initial amount of ink in each ink tank 201 is known, the amount of ink in the ink tank 201 can be estimated by estimating the amount of ink supplied from the ink tank 201 to the buffer tank 202. In other words, the ink supply control unit 409 may be used as the first estimation unit that estimates the amount of ink in each ink tank. Further, the float sensors 203 may be used as the second estimation unit that estimates the amounts of ink in the buffer tanks. In the present embodiment, the example of using the float sensors 203 to estimate the amounts of ink in the buffer tanks 202 is described. However, there is no limitation as such, and, for example, a capacitance detection sensor, or the like, may be used. Further, a float sensor similar to the float sensors 203 located in the buffer tanks 202 may be installed to estimate the amounts of ink in the ink tanks 201.

The above is a description of the configurations of the second printing heads 103 and the second ink supply device 115 in the color printing room 113.

Figure 3:
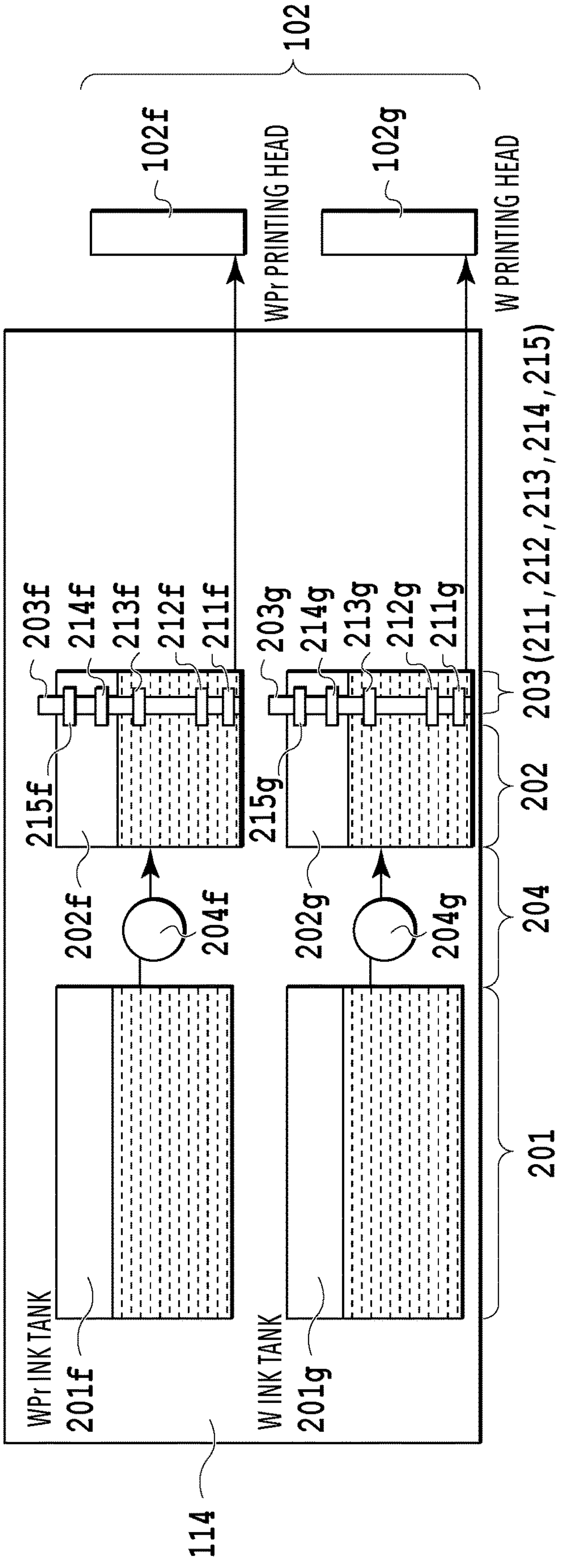
FIG. 3 is a diagram schematically illustrating first printing heads and a first ink supply device.

FIG. 3 is a diagram schematically illustrating the first printing heads 102 and the first ink supply device 114 in the white printing room 112. The configurations of the first printing heads 102 and the first ink supply device 114 in the white printing room 112 are also similar to those described regarding the color printing room 113. In the present embodiment, the two first printing heads 102 are installed. The first printing heads 102 are the printing head 102*f* for WPr (primer liquid for white) and the printing head 102*g* for W (white), in that order from upstream in the conveyance direction of the roll paper 111.

The ink tank 201*f* accommodates WPr and the ink tank 201*g* accommodates W. The inks (liquids) in the ink tanks 201 are supplied to the buffer tanks 202 by the driving force of the supply pumps 204. That is, the liquid in the ink tank 201*f* is supplied to the buffer tank 202*f* by the driving force of the supply pump 204*f*. The ink in the ink tank 201*g* is supplied to the buffer tank 202*g* by the driving force of the supply pump 204*g*. The buffer tanks 202 are equipped with the float sensors 203. That is, the buffer tanks 202*f* and 202*g* are equipped with the float sensors 203*f* and 203*g*, respectively. The liquids (inks) ejected by the first printing heads 102 are supplied from the buffer tanks 202 via ink channels.

Here, in the configuration of the white printing room 112 for W ink, a notification of replacement of the ink tank 201*g* is provided if it is detected that the liquid level of the buffer tank 202*g* for white has fallen below the lower limit position. Then, the control of supplying all the white ink stored in the newly mounted ink tank 201*g* to the buffer tank 202*g* using the supply pump 204*g* is performed. This is because white ink has a precipitation component and thus, after the ink tank 201*g* is agitated by the operator shaking the ink tank 201*g* before installation, etc., the liquid is required to be promptly supplied to the buffer tank 202*g* from that ink tank 201*g*. In the buffer tank 202*g* for white ink, agitation is performed to maintain uniform density.

In this way, for white ink, all the ink in the ink tank 201*g* is supplied to the buffer tank 202*g* at once. Therefore, the capacity of the ink tank 201*g* for white ink is less than the amount determined by "the amount detected by the fifth float 215 (for leakage prevention)"-"the amount detected by the third float 213 (for lower limit detection)" in the buffer tank 202*g* of white ink. That is, even in a case when all the white ink in the ink tank 201*g* is supplied to the buffer tank 202*g* after the displacement of the third float 213 is detected, the amount of white ink contained in the ink tank 201*g* does not reach the position where the fifth float 215 is displaced.

The capacities of the ink tanks 201 in the color printing room 113 do not have such capacity limitation associated with the buffer tanks 202 unlike the ink tank 201 for white ink. Further, the capacity of the ink tank 201 for white primer solution in the white printing room 112 does not have such capacity limitation associated with the buffer tank 202 unlike the ink tank 201 for white ink.

Figure 4:
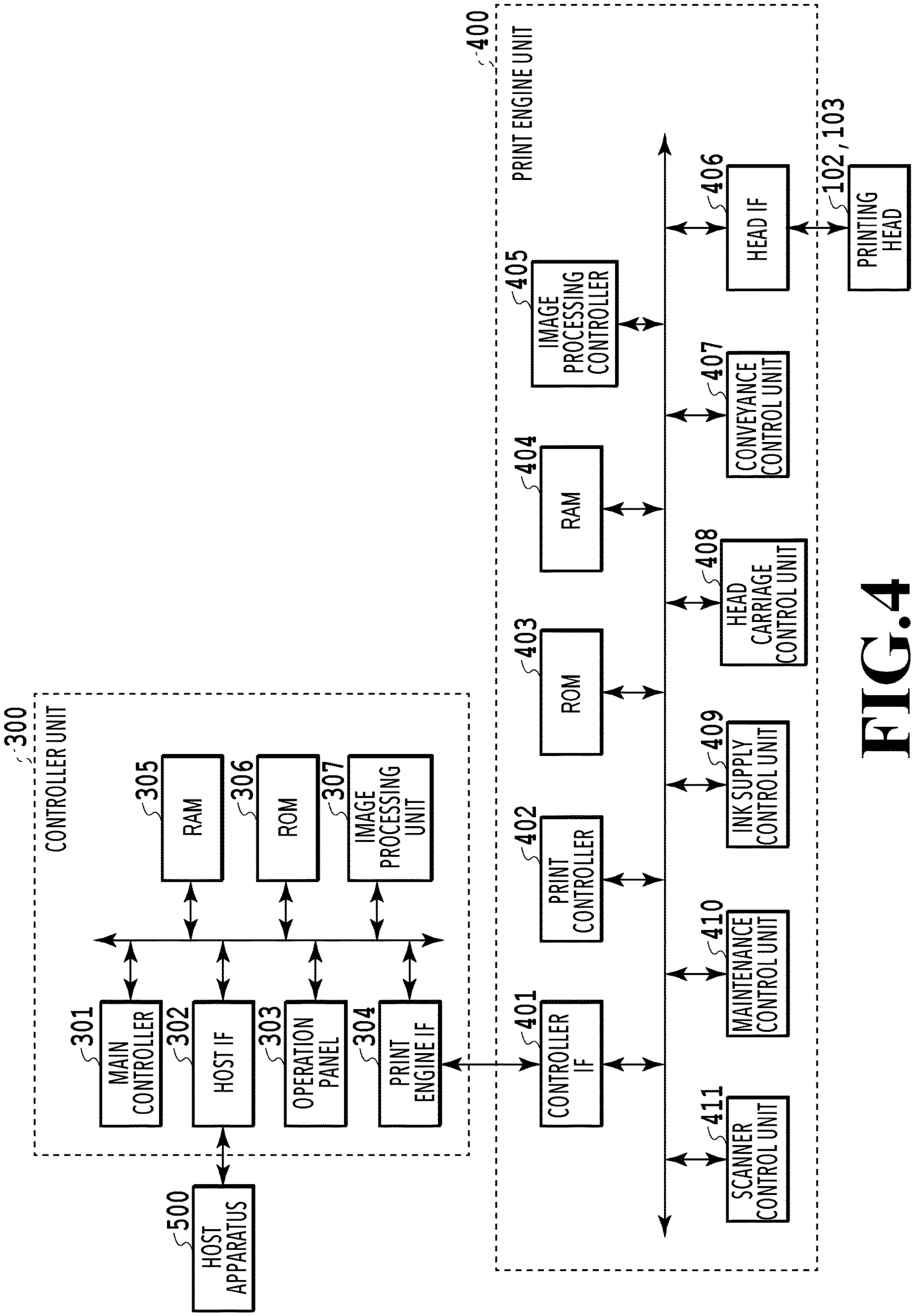
FIG. 4 is a block diagram including a control configuration in the printing apparatus.

FIG. 4 is a block diagram including a control configuration in the printing apparatus 100. The printing apparatus 100 has the print engine unit 400 that controls the print engine and the controller unit 300 that controls the entire inkjet printing apparatus. The controller unit 300 has the main controller 301, the host interface (IF) 302, the operation panel 303, the print engine IF 304, the RAM 305, the ROM 306, and the image processing unit 307. The print engine unit 400 has the controller IF 401, the print controller 402, the ROM 403, the RAM 404, the image processing controller 405, and the head IF 406. Further, the print engine unit 400 has the conveyance control unit 407, the head carriage control unit 408, the ink supply control unit 409, the maintenance control unit 410, and the scanner control unit 411. The print controller 402 controls various mechanisms of the print engine unit 400 in accordance with instructions from the main controller 301 of the controller unit 300. The control configuration is explained below in detail.

In the controller unit 300, the main controller 301, which is configured with a CPU, for example, controls the entire printing apparatus by using the RAM 305 as a work area in accordance with programs and various parameters stored in the ROM 306. For example, if a print job is input from the host apparatus 500 via the host IF 302, the image processing unit 307 performs predetermined image processing for the received image data in accordance with instructions from the main controller 301. The main controller 301 sends the image data, for which the image processing has been performed, to the print engine unit 400 via the print engine IF 304. The printing apparatus 100 may also obtain image data from a connected external storage (a USB memory, etc.). The operation panel 303 is a mechanism for the user to perform input and output operations for the printing apparatus 100. Via the operation panel 303, the user can provide an instruction for an operation such as printing or sheet feeding, set a printing mode, recognize information about the printing apparatus, etc. The operation panel 303 is a touch panel, and a mouse or a keyboard can be connected for input operations. Further, the operation panel 303 may be equipped with a speaker, which can be used as a notification unit for providing a notification to the user via displaying or sound notifications controlled in accordance with instructions from the main controller 301.

In the print engine unit 400, the print controller 402, which is configured with a CPU, controls various mechanisms while using the RAM 404 as a work area in accordance with programs and various parameters stored in the ROM 403. Once each kind of command and image data are received via the controller IF 401, the print controller 402 temporarily saves the received data in the RAM 404. The print controller 402 causes the image processing controller 405 to convert the saved image data into printing data, so as to be utilized by the first printing heads 102 and the second printing heads 103 for a printing operation. After printing data is generated, the print controller 402 causes the first printing heads 102 and the second printing heads 103 via the head IF 406 to execute a printing operation based on the printing data. At that time, the print controller 402 drives the feeding device 104 and the discharge device 105 illustrated in FIG. 1 via the conveyance control unit 407 to convey the roll paper 111, which is a printing medium. Further, the print controller 402 drives the heaters in the first drying device 106 and the second drying device 107 and the fans in the first cooling device 108 and the second cooling device 109 via the conveyance control unit 407, so as to dry and cool the conveyed printing paper. Furthermore, the conveyance control unit 407 can detect the conveyance amount, based on the encoders installed on the conveyance rollers. Printing operations by the first printing heads 102 and the second printing heads 103 are executed in conjunction with conveyance operations of the roll paper in accordance with instructions from the print controller 402.

The first printing heads 102 and the second printing heads 103 are configured to be movable in the direction of gravity (the up-down direction). The first printing heads 102 and the second printing heads 103 are lowered for performing printing and raised for performing maintenance operations or standby, etc. The head carriage control unit 408 changes the up and down positions of the first printing heads 102 and the second printing heads 103 in accordance with operating statuses of the printing apparatus 100 such as a maintenance status or a printing status. The ink supply control unit 409 controls the pressures of the inks supplied to the first printing heads 102 and the second printing heads 103 to stay within the appropriate range in accordance with instructions from the print controller 402. Furthermore, the ink supply control unit 409 controls management of the ink amounts in the first ink supply device 114 and the second ink supply device 115 and notifications of ink tank replacement. Further, the ink supply control unit 409 controls ink supply processes inside the ink supply devices. For performing a maintenance operation for the first printing heads 102 and the second printing heads 103, the maintenance control unit 410 moves the maintenance unit under the raised printing heads and controls the operation of head maintenance such as capping or wiping.

The scanner control unit 411 controls the scanner device 116. In a case when the printing target image data is a test pattern, which is a pattern for calculating various correction values, the print controller 402 instructs the conveyance control unit 407 to reduce the conveyance speed. Furthermore, if the timing for reading the test pattern printed on the roll paper is instructed by the print controller 402, the scanner device 116 performs imaging and saves the printed image in the RAM 404. The process of calculating various correction values using the saved printed image is executed by the print controller 402. The obtained correction values are passed from the print controller 402 to the image processing controller 405, so as to be reflected in printing operations.

Figure 5A:
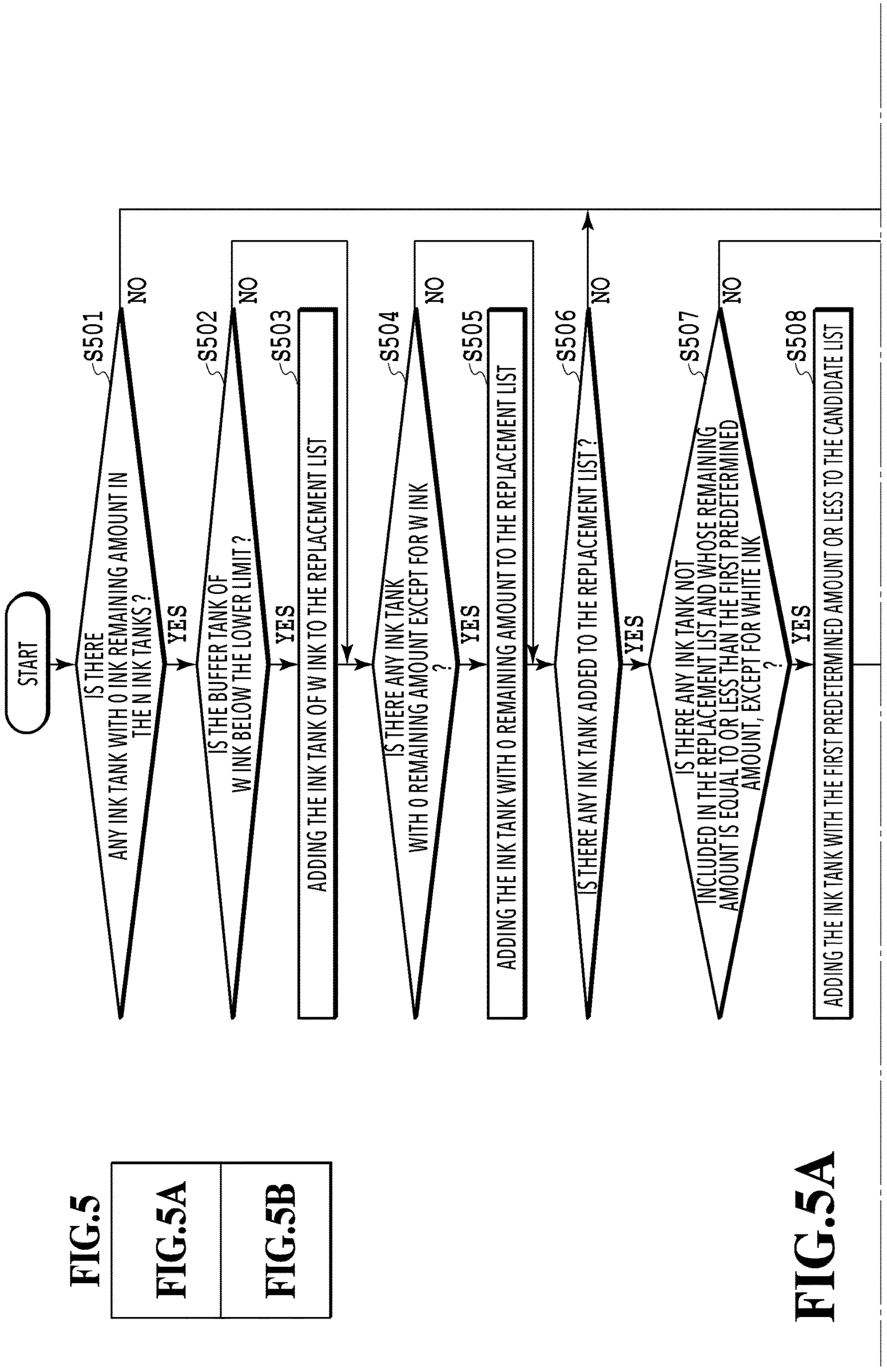
FIGS. 5A and 5B are totally a diagram illustrating a flowchart of a notification control in ink tank replacement.
Figure 5B:
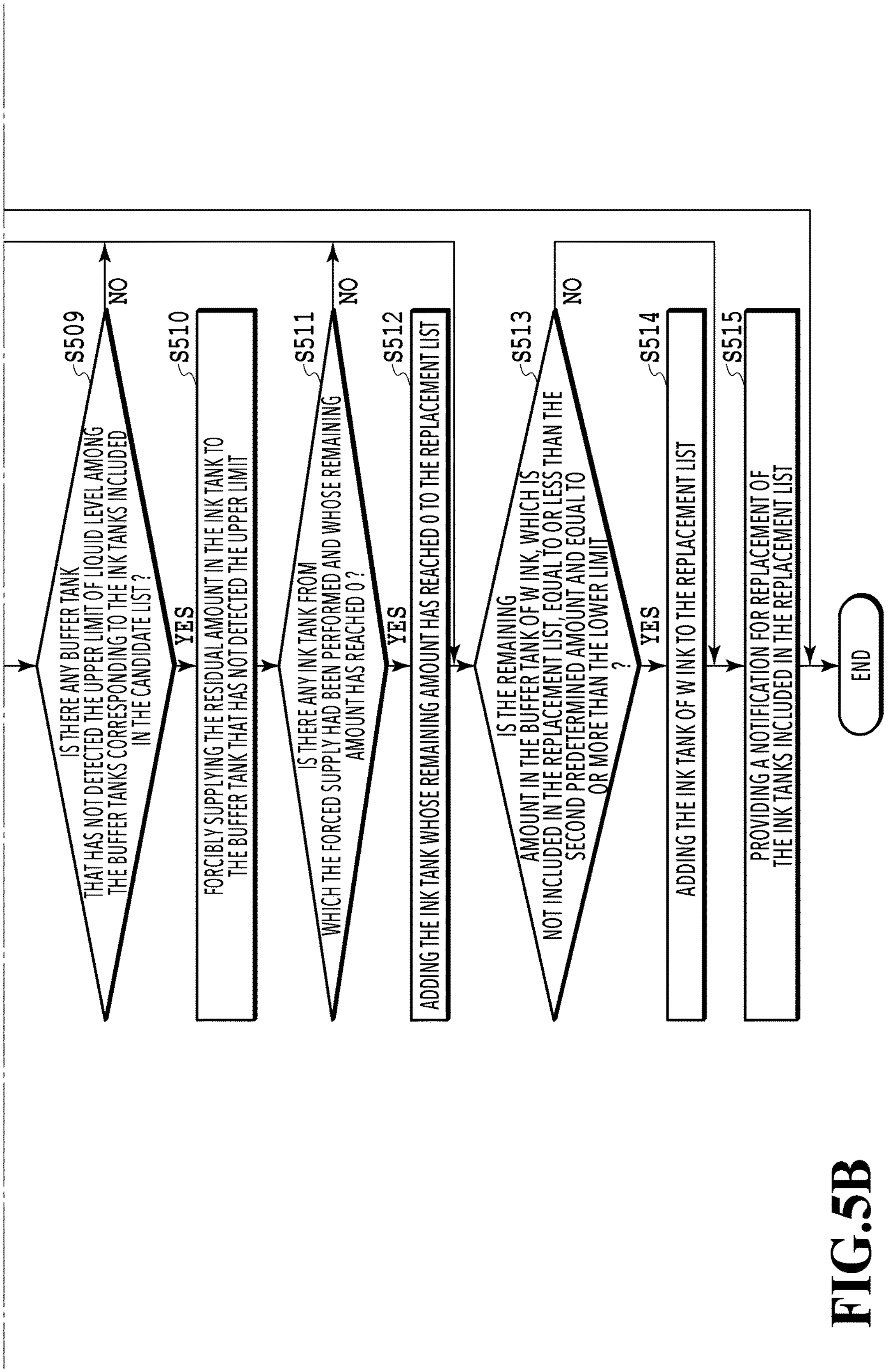

In FIGS. 5A and 5B, a flowchart of the notification control in ink tank replacement according to the present embodiment is illustrated. The processing illustrated in FIGS. 5A and 5B are implemented by the ink supply control unit 409 loading a program stored in the ROM 403 into the RAM 404 and executing the program. In the following explanation, the ink supply control unit 409 is described as the subject that performs the processing, but there is not a limitation as such. The main controller 301 or the print controller 402 may control the ink supply control unit 409 and cause the ink supply control unit 409 to perform the processing illustrated in FIGS. 5A and 5B. It is also possible that a part or all of the functions in the steps of FIGS. 5A and 5B are implemented by hardware such as an ASIC or an electronic circuit. The symbol "S" in the explanation of each process indicates that it is a step of the flowchart diagram.

The processing illustrated in FIGS. 5A and 5B is performed at regular time intervals after the printing apparatus 100 starts operation (after the power is turned on). Further, the processing is also performed after a printing operation is performed. That is, the processing illustrated in FIGS. 5A and 5B is performed on a regular or irregular basis. In FIGS. 5A and 5B, "N" corresponds to the number of ink colors (the number of liquid types) in the printing apparatus 100. Specifically, in the present embodiment, "N" corresponds to "7," which is the total number of the first printing heads 102 and the second printing heads 103.

In S501, the ink supply control unit 409 determines whether there is any ink tank with no ink remaining amount (any empty ink tank) in the N ink tanks 201. In the present example, the determination is made based on the amounts of inks that have been supplied from the ink tanks 201 to the buffer tanks 202 and the capacities of the ink tanks 201. In a case when there is any ink tank 201 with no ink remaining amount, the processing proceeds to S502. In a case when there is no ink tank 201 with no ink remaining amount, the processing of the flowchart in FIGS. 5A and 5B is terminated. In the present embodiment, as for the white ink, since the entire amount thereof is supplied from the ink tank 201 to the buffer tank 202, the processing basically proceeds to S502.

In S502, the ink supply control unit 409 determines whether the liquid level in the buffer tank 202*g* of white ink is below the lower limit. As described above, there is such a relationship that, in a case when the liquid level in the buffer tank 202*g* falls below the lower limit, even if the entire amount of the white ink in the ink tank 201*g* is supplied to the buffer tank 202*g*, the liquid level will not reach the fifth float 215*g* for leakage prevention. Therefore, in a case when the liquid level in the buffer tank 202*g* of white ink is below the lower limit, it is an appropriate timing to replace the ink tank 201*g* of white ink. Therefore, in a case when it is determined in S502 that the liquid level in the buffer tank 202*g* of white ink is below the lower limit, the processing proceeds to S503. In S503, the ink supply control unit 409 adds the ink tank of white ink to the replacement list. The replacement list is a list of ink tank replacement targets. As described below, the notification for prompting ink tank replacement is to be provided for the ink tanks included in the replacement list. After S503, the processing proceeds to S504. In a case when it is determined in S502 that the liquid level in the buffer tank 202*g* of white ink is not below the lower limit, the processing proceeds to S504 as well.

In S504, the ink supply control unit 409 determines whether there is any ink tank 201 with no remaining amount except for white ink. If it is determined that there is any ink tank 201 with no remaining amount except for white ink, the processing proceeds to S505. In S505, the ink supply control unit 409 adds the ink tank with no remaining amount to the replacement list. Then, the processing proceeds to S506. If the ink supply control unit 409 determines in S504 that there is no ink tank 201 with no remaining amount except for white ink, the processing proceeds to S506.

In S506, the ink supply control unit 409 determines whether there is any ink tank 201 added to the replacement list. In a case when there is no ink tank 201 added to the replacement list, the processing of the flowchart illustrated in FIGS. 5A and 5B is terminated since there is no notification target ink tank. In a case when there is any ink tank 201 added to the replacement list, the processing proceeds to S507.

In general processing, for example, a process of prompting replacement of the ink tank 201 added to the replacement list is performed at the point in time of S506. However, in the present embodiment, the process of matching the ink tank replacement timings is performed even for ink tanks that have not reached 0 remaining amount. Accordingly, it is possible to collectively provide a notification of the replacement of multiple ink tanks. The explanation of the processing of FIGS. 5A and 5B is continued below.

In S507, the ink supply control unit 409 determines whether there is any ink tank not included in the replacement list and whose remaining amount is equal to or less than the first predetermined amount, except for white ink. As described above, since the entire amount of white ink is supplied, the remaining amount of white ink in the ink tank 201*g* is basically none. Therefore, in S507, for ink tanks except for white ink, the determination is made as to whether there is any ink tank whose remaining amount is equal to or less than the first predetermined amount. In a case when it is determined that there is an ink tank with the first predetermined amount or less, the processing proceeds to S508, whereas, in a case when it is determined that there is no ink tank with the first predetermined amount or less, the processing proceeds to S513. This first predetermined amount may be different or the same for each ink. The first predetermined amount is an amount determined according to the ink amounts that can be detected in the buffer tank 202 for that ink. For example, in the case of cyan ink, the amount is determined according to the ink amounts that can be detected in the buffer tank 202*c*. Specifically, the amount determined by "the amount detected by the fifth float 215 for leakage prevention detection"–"the amount detected by the fourth float 214 for upper limit detection" in the buffer tank 202 of that ink is the first predetermined amount. As described below, the ink of the ink tank 201 with the first predetermined amount or less is forcibly supplied in a case when the liquid level in the corresponding buffer tank 202 is below the upper limit. That is, the first predetermined amount is an amount in a range within which, even if the ink is forcibly supplied, the liquid level will not be detected by the fifth float 215 for leakage prevention detection.

In S508, the ink supply control unit 409 adds the ink tank 201 with the first predetermined amount or less to the candidate list of possible forced supply. In a case when there are multiple ink tanks 201 with the first predetermined amount or less, all of the multiple ink tanks 201 are added to the candidate list of possible forced supply. The candidate list of possible forced supply is a list that includes targets for ink supply from the ink tank 201 to the buffer tank 202 even if the liquid level in the buffer tank 202 is not below the lower limit. The above-described replacement list and candidate list are saved in the RAM 404. The replacement list and the candidate list are cleared at a timing where the processing of the flowchart in FIGS. 5A and 5B is terminated. After S508, the processing proceeds to S509.

In S509, among the buffer tanks 202 for the inks corresponding to the ink tanks 201 included in the candidate list of possible forced supply, the ink supply control unit 409 determines whether there is any buffer tank 202 that has not detected the upper limit of liquid level. That is, whether there is any buffer tank 202 in which the fourth float 214 for upper limit detection has not detected displacement is determined. As described above, for example, in the color printing room 113, in a case when the lower limit of each buffer tank 202 is detected, the amount to detect the upper limit of the buffer tank is supplied from the ink tank 201 to the buffer tank 202. Not detecting the upper limit of liquid level indicates that the liquid level in that buffer tank 202 is below the fourth float 214 for upper limit detection.

Further, the liquid level is above the third float 213 for lower limit detection. This is because, as described above, in a case when the liquid level is below the third float 213 for lower limit detection, the ink is to be supplied from the ink tank 201 to the buffer tank 202. In a case when it is determined in S509 that there is any buffer tank 202 whose upper limit of liquid level has not been detected, the processing proceeds to S510. In a case when it is determined in S509 that there is no buffer tank 202 whose upper limit of liquid level has not been detected, the processing proceeds to S513.

In S510, the ink supply control unit 409 forcibly supplies the residual ink stored in the ink tank 201 to the buffer tank 202 that has not detected the upper limit of liquid level among the inks in the candidate list. The amount of ink forcibly supplied at this time is an amount whose maximum amount is the "first predetermined amount" of that ink described in S508. As a result, the liquid level will be at a position above the liquid level detected by the fourth float 214 for upper limit detection and below the liquid level detected by the fifth float 215 for leakage prevention detection. Depending on the amount of ink stored in the ink tank 201 from which the forced supply is performed, ink may not be supplied up to a level above the liquid level detected by the fourth float 214 for upper limit detection. In any case, in S510, ink is forcibly supplied up to a liquid level beyond the liquid level at which, as the upper limit, no further ink supply is performed in normal ink supply. In a case when there are multiple buffer tanks 202 whose upper limit of liquid level has not been detected, ink is forcibly supplied to all of those multiple buffer tanks 202. After S510, the processing proceeds to S511.

In S511, the ink supply control unit 409 determines whether there is any ink tank from which the forced supply had been performed and whose remaining amount has reached zero. In a case when it is determined that there is no ink tank from which the forced supply had been performed and whose remaining amount has reached zero, the processing proceeds to S513. In a case when it is determined that there is an ink tank from which the forced supply had been performed and whose remaining amount has reached zero, the processing proceeds to S512.

In S512, the ink supply control unit 409 adds the ink tank whose remaining amount has reached zero to the replacement list. After S512, the processing proceeds to S513.

In S513, the ink supply control unit 409 determines whether the remaining amount in the buffer tank 202 corresponding to the ink tank of white ink, which is not included in the replacement list, is equal to or less than the second predetermined amount. The second predetermined amount in S513 is different from the first predetermined amount in S507. The explanation is given above in S507 that the amount determined by "the amount detected by the fifth float 215 for leakage prevention detection"–"the amount detected by the fourth float 214 for upper limit detection" in the buffer tank 202 of that ink is the first predetermined amount. The second predetermined amount in S513 is the amount determined by "the amount detected by the fifth float 215 for leakage prevention detection"–"the amount detected by the third float 213 for lower limit detection" in the buffer tank 202*g*. As described above, for white ink, the ink tank 201*g* is replaced in a case where the liquid level in the buffer tank 202*g* falls below the liquid level detected by the third float 213 for lower limit detection. At this time, all the ink in ink tank 201*g* is supplied to the buffer tank 202*g*. Therefore, if the remaining amount in the buffer tank 202*g* is smaller than the amount determined by "the amount detected by the fifth float 215 for leakage prevention detection"–"the amount detected by the third float 213 for lower limit detection", there is no problem in replacing the ink tank before the normal ink tank replacement. That is, even if all the ink in the ink tank 201*g* is supplied to the buffer tank 202*g* in excess of the upper limit, the ink does not reach the liquid level to be detected by the fifth float 215 for leakage prevention detection. Therefore, in a case when it is determined that the remaining amount in the buffer tank 202*g* corresponding to the ink tank of white ink, which is not included in the replacement list, is equal to or less than the second predetermined amount, the processing proceeds to S514. The remaining amount in the buffer tank 202*g* corresponding to the ink tank of white ink, which is not included in the replacement list, is above the liquid level detected by the third float 213 for lower limit detection. This is because the ink tank has already been added to the replacement list in S503 in a case when the liquid level in the buffer tank 202*g* is smaller than the liquid level to be detected by the third float 213 for lower limit detection. In other words, it can be said that the process of S513 is, in effect, the process of determining whether the remaining amount in the buffer tank 202*g* is equal to or less than the predetermined amount and equal to or more than the lower limit. In S514, the ink supply control unit 409 adds the ink tank of white ink to the replacement list. After S514, the processing proceeds to S515. In a case when it is determined in S513 that the remaining amount in the buffer tank 202 corresponding to the ink tank of white ink, which is not included in the replacement list, is not equal to or less than the second predetermined amount, the processing proceeds to S515.

In S515, the ink supply control unit 409 performs the control of providing a notification for prompting replacement of the ink tanks included in the replacement list. For example, the ink supply control unit 409 displays a message for prompting replacement of the ink tanks on the operation panel 303 via the controller IF 401. Then, the processing in the flowchart illustrated in FIGS. 5A and 5B is terminated. The notification is not limited to displaying, but may also include outputs such as audio or warning lamps.

As explained above, by following the processing of FIGS. 5A and 5B, the residual inks in the ink tanks 201 can be forcibly supplied to the buffer tanks 202, and a notification operation can be performed to prompt ink tank replacement in a state with the presence of multiple empty ink tanks.

For example, below is an assumption that the remaining amount in the ink tank 201*d* of magenta ink is equal to or less than the first predetermined amount for magenta ink in a case where the ink tank 201*c* of cyan ink becomes empty. Further, it is assumed that the liquid level in the buffer tank 202*d* of magenta ink is above the lower limit detection position and below the upper limit detection position. In this case, waiting for a notification of replacement of the ink tank for cyan ink until the liquid level in the buffer tank 202*d* of magenta ink falls below the lower limit detection position may not result in an appropriately timed notification, depending on the degree of ink consumption. In the present embodiment, even if the liquid level in the buffer tank 202*d* of magenta ink is above the lower limit detection position, if the liquid level is below the upper limit detection position, the residual ink in the ink tank 201*d* is forcibly supplied up to a position beyond the upper limit of the buffer tank 202*d*. Accordingly, a notification of replacement of the ink tanks of both cyan ink and magenta ink can be provided together in a case where the ink tank 201*d* of magenta ink becomes empty.

Further, in a case of chromatic color inks and white ink, the same collective notification can be provided. For example, below is an assumption that the remaining amount in the buffer tank 202*g* of white ink is equal to or less than the second predetermined amount for white ink and above the lower limit detection position in a case when the ink tank 201*c* of cyan ink becomes empty. In this case, a notification of replacement of the ink tanks of both cyan ink and white ink can be provided together. The entire amount of the ink in the replaced ink tank 201*g* of white ink will be supplied to the buffer tank 202*g*. At this time, white ink is supplied beyond the upper limit detection position in the buffer tank 202*g* of white ink.

Below is an explanation of an example in which white ink reaches a replacement timing first. It is assumed that the remaining amount in the buffer tank 202*g* of white ink is less than the lower limit detection position. Further, at this time, it is assumed that the remaining amount in the ink tank 201*c* of cyan ink is equal to or less than the first predetermined amount. In this case, the residual ink in the ink tank 201*c* of cyan ink is forcibly supplied from the ink tank 201*c* to the buffer tank 202*c*. Accordingly, a notification of replacement of the ink tanks of both cyan ink and white ink can be provided together.

As explained above, according to the present embodiment, it is possible to inform the user of ink tank replacement at an appropriate timing. That is, at a timing when the ink tank is due for replacement, the ink supply from other ink tanks is adjusted, and thus efficient replacement of multiple empty ink tanks can be performed. For example, in a case when an empty ink tank exists among multiple ink tanks, if the remaining amount of ink in any of the ink tanks other than the empty ink tank is equal to or less than a predetermined amount, the residual ink in that ink tank is forcibly supplied to the buffer tank. In this forced supply, the supply is forcibly performed beyond the position that is defined as the upper limit in normal supply. Then, a notification operation for prompting ink tank replacement is provided in a state with the presence of multiple empty ink tanks. Accordingly, the users can perform a job of replacing multiple empty ink tanks in an efficient manner.

OTHER EMBODIMENTS

In the above-described embodiment, the explanation is given of the example in which the printing apparatus 100 has the multiple first printing heads 102 and second printing heads 103. The first printing heads 102 and second printing heads 103 do not have to be full line heads, but may be serial systems that eject ink to form an ink image while the removably-mounted carriages are moved in the scanning direction. Further, the printing medium can be sheet-fed paper instead of the roll paper 111, and, in that case, a conveyance mechanism suitable for sheet-fed paper is installed.

In the above-described embodiment, the explanation is given of the example in which the one ink tank 201 and buffer tank 202 for white ink are mounted in the printing apparatus 100, but there may be more than one. Further, in the above-mentioned embodiment, the explanation is given of the example in which white ink is mounted, but a configuration in which white ink is not mounted and only chromatic color inks (for example, the color printing room 113 only) are present is also possible. In a case when white ink is not mounted, the processing described in FIGS. 5A and 5B can be performed by skipping the processes related to white ink. Specifically, for example, in FIGS. 5A and 5B, it is possible to have such a form with a configuration in which S502 to S504, S513, and S514 are deleted, and, if a determination of YES is made in S501, the processing proceeds to S505.

Embodiment(s) of the present disclosure can also be realized by a computer of a system or an apparatus that reads out and executes computer executable instructions (e.g., one or more programs) printed on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing apparatus comprising:

a first printing head and a second printing head configured to eject ink;

a first buffer tank installed corresponding to the first printing head and configured to store ink to be supplied to the first printing head;

a second buffer tank installed corresponding to the second printing head and configured to store ink to be supplied to the second printing head;

a first ink tank installed corresponding to the first buffer tank and configured to store ink to be supplied to the first buffer tank, the first ink tank being removable from the printing apparatus;

a second ink tank installed corresponding to the second buffer tank and configured to store ink to be supplied to the second buffer tank, the second ink tank being removable from the printing apparatus;

a first estimation unit configured to estimate ink amounts in the first ink tank and the second ink tank, respectively;

a second estimation unit configured to estimate ink amounts in the first buffer tank and the second buffer tank, respectively;

a control unit configured to control supply of ink, the control unit being configured to execute;

a first supply process in which, if the second estimation unit estimates that a liquid level in the first buffer tank has reached a lower limit position, an amount of ink to make the liquid level in the first buffer tank reach an upper limit position is supplied from the first ink tank to the first buffer tank, and a second supply process in which, if the first estimation unit estimates that the first ink tank corresponding to the first buffer tank is empty of ink, a remaining ink in the second ink tank corresponding to the second buffer tank is supplied up to a liquid level beyond an upper limit position in the second buffer tank, depending on the ink amount in the second ink tank and the ink amount in the second buffer tank; and a notification unit configured to provide a notification of replacement of the first ink tank and the second ink tank after the second supply process is executed.

2. The printing apparatus according to claim 1, wherein, in the second supply process, in a case when the ink amount in the second ink tank is equal to or less than a predetermined amount and the liquid level in the second buffer tank is not beyond the upper limit position, the control unit is configured to control supply of the remaining ink in the second ink tank up to a liquid level beyond the upper limit position in the second buffer tank.

3. The printing apparatus according to claim 2, wherein the predetermined amount is an amount determined based on an ink amount between the upper limit position in the second buffer tank and a leakage prevention position which that is beyond the upper limit position.

4. The printing apparatus according to claim 1, wherein, in a case when the first estimation unit estimates that the first ink tank is empty of ink, if the remaining ink in the second ink tank is not supplied, the notification unit is configured to provide a notification of replacement of the first ink tank.

5. The printing apparatus according to claim 1, further comprising:

a third printing head configured to eject ink including a precipitation component;

a third buffer tank configured to store ink to be supplied to the third printing head; and a third ink tank configured to store ink to be supplied to the third buffer tank, the third ink tank being removable from the printing apparatus, wherein the second estimation unit is configured to further estimate an ink amount in the third buffer tank, wherein the control unit is configured to execute a third supply process in which all the ink in the third ink tank is supplied to the third buffer tank, and wherein, in a case when the second estimation unit estimates that a liquid level of the third buffer tank has fallen below a lower limit position, the notification unit is configured to provide a notification of replacement of the third ink tank.

6. The printing apparatus according to claim 5, wherein, in a case when the second estimation unit estimates that the liquid level of the third buffer tank has fallen below the lower limit position, the control unit is configured to execute a fourth supply process in which the remaining ink in the second ink tank is supplied up to a liquid level beyond the upper limit position in the second buffer tank, and wherein the notification unit is configured to provide a notification of replacement of the second ink tank and the third ink tank after the control unit executes the fourth supply process.

7. The printing apparatus according to claim 6, wherein, in a case when the first estimation unit estimates that the first ink tank is empty of ink, if the ink amount in the third buffer tank is equal to or less than a predetermined amount and is an amount at a position beyond the lower limit position, the notification unit is configured to provide a notification of replacement of the first ink tank and the third ink tank.

8. The printing apparatus according to claim 5, wherein a capacity of the third ink tank is less than an amount obtained by subtracting an ink amount corresponding to the lower limit position in the third buffer tank from an ink amount corresponding to a leakage prevention position in the third buffer tank.

9. The printing apparatus according to claim 5, wherein the third printing head is a printing head configured to eject white ink.

10. The printing apparatus according to claim 1, wherein the first printing head and the second printing head are printing heads configured to eject color inks.

11. A control method of a printing apparatus including:

a first printing head and a second printing head configured to eject ink;

a first buffer tank installed corresponding to the first printing head and configured to store ink to be supplied to the first printing head;

a second buffer tank installed corresponding to the second printing head and configured to store ink to be supplied to the second printing head;

a first ink tank installed corresponding to the first buffer tank and configured to store ink to be supplied to the first buffer tank, the first ink tank being removable from the printing apparatus;

a second ink tank installed corresponding to the second buffer tank and configured to store ink to be supplied to the second buffer tank, the second ink tank being removable from the printing apparatus;

a first estimation unit configured to estimate ink amounts in the first ink tank and the second ink tank; and a second estimation unit configured to estimate ink amounts in the first buffer tank and the second buffer tank, the control method comprising:

executing a first supply process in which, if the second estimation unit estimates that a liquid level in the first buffer tank has reached a lower limit position, an amount of ink to make the liquid level in the first buffer tank reach an upper limit position is supplied from the first ink tank to the first buffer tank;

executing a second supply process in which, if the first estimation unit estimates that the first ink tank corresponding to the first buffer tank is empty of ink, a remaining ink in the second ink tank corresponding to the second buffer tank is supplied up to a liquid level beyond an upper limit position in the second buffer tank, depending on the ink amount in the second ink tank and the ink amount in the second buffer tank; and providing a notification of replacement of the first ink tank and the second ink tank after the second supply process is executed.

* * * * *